United States Patent [19]

Denayer

[11] 3,860,580

[45] Jan. 14, 1975

[54] 1,5-ETHENO-2H-3-BENZAZEPIN-2-ONES
[75] Inventor: Rene Denayer, Brussels, Belgium
[73] Assignee: U B C, Societe Anonyme, Saint-Gilles-lex-Bruxelles, Belgium
[22] Filed: July 10, 1972
[21] Appl. No.: 270,065

[30] Foreign Application Priority Data
July 12, 1971 Great Britain.................. 32545/71

[52] U.S. Cl............ 260/239.3 T, 424/244, 260/590
[51] Int. Cl............................................. C07d 41/08
[58] Field of Search .......................... 260/239.3 T

[56] References Cited
UNITED STATES PATENTS
3,371,085  2/1968  Reeder et al. .............. 260/239.3 D
FOREIGN PATENTS OR APPLICATIONS
1,208,733  10/1970  Great Britain ............... 260/239.3 D OTHER PUBLICATIONS
Von Doering et al., "Tetrahedron" Vol. 5, pages 53–69 (1959).
March, "Advanced Organic Chemistry" pages 819–820, (McGraw-Hill) (1968).

Primary Examiner—Henry R. Jiles
Assistant Examiner—Robert T. Bond
Attorney, Agent, or Firm—Wenderoth, Lind & Ponack

[57] ABSTRACT

1,3,4,5-tetrahydro-1,5-etheno-2H-3-benzazepin-2-ones having the formula

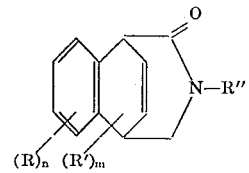

in which R and R' represent each hydrogen, halogen, hydroxyl, alkyl or alkoxy, R" represents hydrogen, alkyl, hydroxyalkyl, dialkylaminoalkyl, carbalkoxy, alkenyl, aralkyl or a carbamyl of the formula —CONHR''', R''' being hydrogen, alkyl, alkenyl, aralkyl or aryl, and each of $n$ and $m$ is 1 or 2, their pharmaceutically acceptable salts and processes for the preparation thereof. These compounds may be used as anxiolytics and as stimulants of mental activity.

12 Claims, No Drawings

1,5-ETHENO-2H-3-BENZAZEPIN-2-ONES

The present invention relates to new benzazepinones, their preparation and their utilization; it relates more particularly to derivatives of 1,3,4,5-tetrahydro-1,5-etheno-2H-3-benzazepin-2-one having the general formula (I):

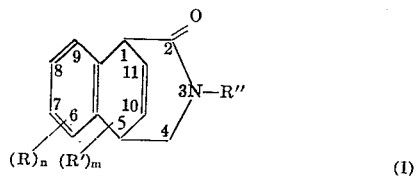

(I)

in which
- R and R' represent each hydrogen, a halogen, hydroxyl, $C_1$–$C_4$-alkyl or $C_1$–$C_4$-alkoxy, R' occupying at least one of positions 1, 5, 10 and 11,
- R'' represents hydrogen, an alkyl, hydroxyalkyl, dialkylaminoalkyl or carbalkoxy group, each alkyl of which has 1 to 5 carbon atoms, a $C_2$–$C_4$-alkenyl, an aralkyl group or a carbamyl group having the formula -CONHR''', R''' being hydrogen, $C_1$–$C_4$-alkyl, $C_2$–$C_4$-alkenyl, aralkyl or aryl, and
- n and m are each a whole number 1 or 2, and to their addition salts with pharmaceutically acceptable acids.

a. In order to prepare the compounds of formula (I) in which R'' represents hydrogen, an $(R)_n$, $(R')_m$-substituted 1,4-dihydro- 1,4-ethano-naphthalen-9-one having the formula (II) is subjected to the action of hydrazoic acid in the presence of an acid catalyst according to the following equation:

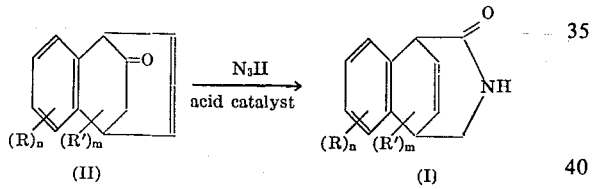

wherein R, R', n and m have the meanings given above.

b. In order to prepare the compounds of formula (I) in which R'' is alkyl, hydroxyalkyl, dialkylaminoalkyl, carbalkoxy, alkenyl, or aralkyl, the metallic derivative of a 1,3,4,5-tetrahydro-1,5-etheno-2H-3-benzazepin-2-one of formula (I) in which R'' = H (e.g. prepared as in a) above) is reacted in known manner with a compound of formula R''X according to the following equation:

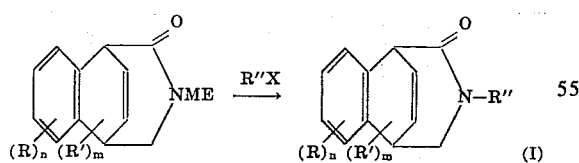

wherein Me is an alkali metal or an alkaline earth metal, X is halogen, tosylate or the like, R'' is alkyl, hydroxyalkyl, dialkylaminoalkyl, carbalkoxy, alkenyl or aralkyl and R, R', n and m have the meanings given above.

c. In order to prepare the compounds of formula (I) in which R'' is a carbamyl group having the formula —CONHR''', a 1,3,4,5-tetrahydro-1,5-etheno-2H-3-benzazepin-2-one of formula (I) in which R'' = H (e.g. prepared as in a) above) is reacted in known manner with an isocyanate of formula R'''—N=C=O according to the following equation:

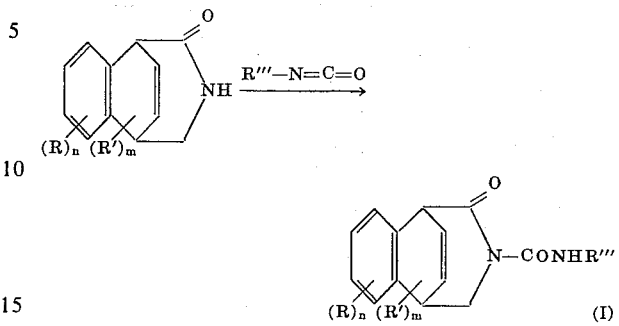

R, R', R''', n and m having the meanings given above.

When the starting compounds, i.e. the 1,4-dihydro-1,4-ethanonaphthalen-9-ones of formula (II) are not known from the literature, they can be prepared from the corresponding $(R)_n$, $(R')_m$ -substituted beta-naphthols and maleic anhydride to form Diels-Alder addition compounds which are thereafter subjected to decarboxylation according to the following equation:

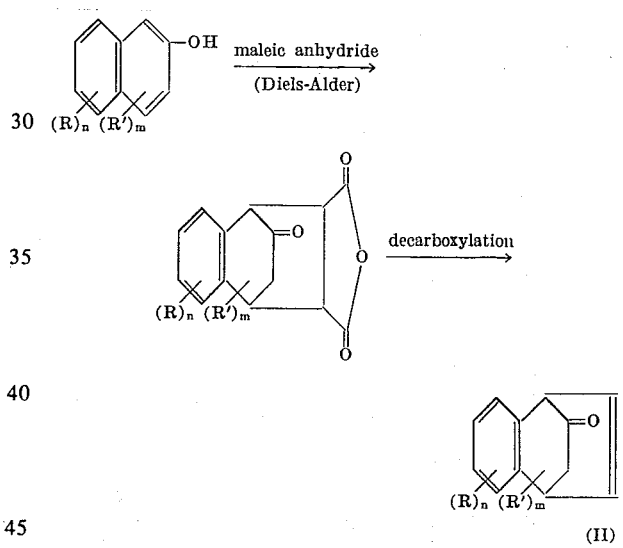

R, R', n and m have the meanings given above.

Below there are given some non-limitative Examples of preparation of the compounds according to the invention.

PREPARATION OF STARTING NAPHTHALENONES.

A. Preparation of 7-chloro-9-oxo-1,2,3,4-tetrahydro-1,4-ethanonaphthalene-2,3-dicarboxylic acid anhydride and its homologues.

A mixture of 44.7 g (0.25 M) of 6-chloro-2-naphthol and 122.5 g. (1.25 M) maleic anhydride is heated for 30 minutes at 180°C. with vigorous stirring. After cooling, the excess maleic anhydride is distilled off under reduced pressure.

The residue is extracted with 500 ml. benzene in the presence of animal black. After filtration and evaporation of the solvent, the product is recrystallized from a benzene-ether mixture. 48.4 g. of the purified product with a yield of 70% is obtained. M.P. 165°–190°C. (mixture of endo/exo forms).

Analysis for $C_{14}H_9ClO_4$ (276.5)
  calc. (%) C 60.7 H 3.3 Cl 12.8
  found (%) 60.5 3.1 12.6

The following compounds were prepared by this method:

4-methyl-9-oxo-1,2,3,4-tetrahydro-1,4-ethano-naphthalene-2,3-dicarboxylic acid anhydride.
  M.P. 180°–183°C.; yield 65%.

7-bromo-9-oxo-1,2,3,4-tetrahydro-1,4-ethano-naphthalene-2,3-dicarboxylic acid anhydride.
  M.P. 220°–226°C.; yield 56% (known product).

7-ethyl-9-oxo-1,2,3,4-tetrahydro-1,4-ethano-naphthalene-2,3-dicarboxylic acid anhydride.
  M.P. 155°–185°C. (endo-exo mixture); yield 75%.

7-methyl-9-oxo-1,2,3,4-tetrahydro-1,4-ethano-naphthalene-2,3-dicarboxylic acid anhydride.
  M.P. 190°–194°C.; yield 22%.

7-methoxy-9-oxo-1,2,3,4-tetrahydro-1,4-ethano-naphthalene-2,3-dicarboxylic acid anhydride.
  M.P. 242°–245°C.; yield 41%.

6,7-dimethyl-9-oxo-1,2,3,4-tetrahydro-1,4-ethano-naphthalene-2,3-dicarboxylic acid anhydride.
  M.P. 255°–257°C.; yield 8%.

6-methoxy-9-oxo-1,2,3,4-tetrahydro-1,4-ethano-naphthalene-2,3-dicarboxylic acid anhydride.

6-hydroxy-9-oxo-1,2,3,4-tetrahydro-1,4-ethano-naphthalene-2,3-dicarboxylic acid anhydride.
  M.P. 295°C. (known compound).

7-hydroxy-9-oxo-1,2,3,4-tetrahydro-1,4-ethano-naphthalene-2,3-dicarboxylic acid anhydride.
  M.P. 277°–278°C. (known compound).

B. Preparation of 1,4-dihydro-1,4-ethano-naphthalen-9-one and of its homologues.

150 ml. of triethylamine is added to a solution of 150 g. (0.62 M) of 9-oxo-1,2,3,4-tetrahydro-1,4-ethano-naphthalene-2,3-dicarboxylic acid anhydride in 2.2 l. of a 90:10 pyridine-water mixture. The mixture is electrolyzed while stirring (1.3 amperes, platinum electrodes) for 76 hours. The temperature of the electrolysis cell is maintained at about 5°C. by means of a cryostat. At the end of the reaction, the mixture is poured in 8 l. benzene. The benzene phase is decanted, washed with water, filtered, dried and evaporated under reduced pressure. The residue is purified by distillation (B.P. 120°–130°C./1 mm.Hg.) then by recrystallization from a 1:3 ether-hexane mixture. 37.3 g. of desired product is obtained with a 35% yield. M.P. 56°–57°C. according to K. KITAHONOKI and Y. TAKANO, Tetrahedron Letters, 1963,1597, this M.P. is 56.5°–58°C.).

This compound can also be prepared by decarboxylation according to the following method:

25.5 g. (0.04 mole) of di-(triphenyl-phosphine)-nickel dicarbonyle are added to a solution of 9.6 g. (0.04 mole) of 9-oxo-1,2,3,4-tetrahydro-1,4-ethano-naphthalene-2,3-dicarboxylic acid anhydride in 150 ml. of diglyme and the mixture is heated under reflux for 3 hours. The solvent is evaporated under reduced pressure. The residue is treated with water then with a 1:1 chloroform-ether mixture. The organic phase is separated, dried on sodium sulfate and evaporated. The residue is purified by chromatography on a silica column (eluent: toluene). 1.1 g. of the desired product is thus obtained with a yield of 15%.

The following naphthalenones were also prepared by the electrolysis method:

7-bromo-1,4-dihydro-1,4-ethano-naphthalen-9-one.
  M.P. 125°–130°C.; yield 32%.

7-chloro-1,4-dihydro-1,4-ethano-naphthalen-9-one.
  M.P. 124°–126°C.; yield 26%

Analysis for $C_{12}H_9ClO$ (204.5):
  calc. (%) C 70.6 H 4.4
  found (%) 71.1 4.6

7-methyl-1,4-dihydro-1,4-ethano-naphthalen-9-one.
  M.P. 99°–100°C.; yield 21%.

Analysis for $C_{13}H_{12}O$ (184):
  calc. (%) C 84.8 H 6.5
  found (%) 83.7 6.3

7-ethyl-1,4-dihydro-1,4-ethano-naphthalen-9-one.
  M.P. 48°–49°C.; yield 28%.

Analysis for $C_{14}H_{14}O$ (198):
  calc. (%) C 85.0 H 7.1
  found (%) 84.3 7.3

4-methyl-1,4-dihydro-1,4-ethano-naphthalen-9-one.
  M.P. 89°–90°C. ; yield 28%.

Analysis for $C_{13}H_{12}O$ (184):
  calc. (%) C 84.8 H 6.5
  found (%) 83.1 6.7

6,7-dimethyl-1,4-dihydro-1,4-ethano-naphthalen-9-one.

7-methoxy-1,4-dihydro-1,4-ethano-naphthalen-9-one.

6-methoxy-1,4-dihydro-1,4-ethano-naphthalen-9-one.

PREPARATION of BENZAZEPINONES ACCORDING to the INVENTION.

Example 1.

Preparation of 1,3,4,5-tetrahydro-1,5-etheno-2H-3-benzazepin-2-one.

47 g. (0.276 mole) of 1,4-dihydro-1,4-ethano-naphthalen-9-one is added to a mixture of 200 ml. of chloroform, 75 ml. of concentrated sulfuric acid, and 12 g. of phosphorus pentoxide.

This mixture is cooled to 0°C. and 270 ml. of a normal solution of hydrazoic acid in chloroform (containing 11.6 g. of $HN_3$) is added drop by drop while agitating.

The reaction medium is allowed to heat up to 15°C. and is then poured on to ice. The mixture is neutralized by adding aqueous sodium hydroxide. The mixture thus neutralized is filtered over "Hyflocel." The filtrate is composed of a chloroform phase and of an aqueous phase. The chloroform phase is separated, the aqueous phase is extracted with 200 ml. of chloroform, and this extract is added to the chloroform phase, which is thereupon washed with water and then dried over anhydrous sodium sulfate.

The chloroform solution is evaporated to dryness and the residue taken up in ethyl ether. A white crystalline precipitate is formed, which is separated by filtration and recrystallized from ethanol, thus obtaining 12.6 g. of 1,3,4,5-tetrahydro-1,5-ethano-2H-3-benzazepin-2-one.

M.P. 209°C.; yield 23%.
Analysis for $C_{12}H_{11}NO$ (185):
  calc. (%) C 77.8 H 5.9 N 7.6
  found (%) 77.9 6.1 7.4

By evaporation of the ethereal filtrate of dryness and distillation of the residue at 110°–115°C. at a pressure of 0.001 mm.Hg., there is obtained 22 g. of 1-naphthalene-acetonitrile.

The 1,4-dihydro-1,4-ethano-naphthalen-9-one used as starting product is a known compound (cf. H.E. ZIMMERMANN, R.S. GIVENS and R.M. PAGNI, J.Am. chem.Soc. 90, (1968), p.6105).

EXAMPLE 2.

Preparation of 7-chloro-1,3,4,5-tetrahydro-1,5-etheno-2H-3-benzazepin-2-one.

149 ml. of hydrazoic acid in chloroform (0.97 M) is added drop by drop under vigorous stirring to a mixture of 29 g. (0.14 mole) of 7-chloro-1,4-dihydro-1,4-ethano-naphthalen-9-one, 150 ml. of chloroform and 70 ml. of concentrated sulfuric acid, cooled to −15°C. The reaction is continued for 90 minutes at −10°C. The reaction mixture is then poured on to a mixture of 500 g. of ice, 200 g. of sodium carbonate and 500 ml. of chloroform while maintaining the temperature at or below 0°C. The mixture is filtered on "Hyflocel" and the organic phase is separated. The aqueous phase is thrice extracted with 200 ml. portions of chloroform. The combined organic phases are washed with water and dried over anhydrous sodium sulfate. The solvent is evaporated and the solid residue obtained is recrystallized from a 1:2 chloroform-hexane mixture. 7.9 g. of purified compound is obtained with a 25% yield. M.P. 223–224°C.

Analysis for $C_{12}H_{10}ClNO$ (219.5):
  calc. (%) C 65.6 H 4.5 N 6.0
  found (%) 65.4 4.4 6.1

The following N-unsubstituted benzazepinones were also prepared by the method of Examples 1 and 2:

7-bromo-1,3,4,5-tetrahydro-1,5-etheno-2H-3-benzazepin-2-one.
M.P. 245°–247°C.; yield 10%.
Analysis for $C_{12}H_{10}BrNO$ (264):
  calc. (%) C 54.6 H 4.1 N 5.3
  found (%) 54.9 3.9 5.4

7-ethyl-1,3,4,5-tetrahydro-1,5-etheno-2H-3-benzazepin-2-one.
M.P. 170°–171°C.; yield 18%.
Analysis for $C_{14}H_{15}NO$ (213):
  calc. (%) C 78.9 H 7.0 N 6.6
  found (%) 78.7 7.1 6.6

7-methyl-1,3,4,5-tetrahydro-1,5-etheno-2H-3-benzazepin-2-one.
M.P. 221°–223°C.; yield 20%.
Analysis for $C_{13}H_{13}NO$ (199):
  calc. (%) C 78.4 H 6.5 N 7.0
found (%) 78.4 6.6 7.1

1-methyl-1,3,4,5-tetrahydro-1,5-etheno-2H-3-benzazepin-2-one.
7,8-dimethyl-1,3,4,5-tetrahydro-1,5-etheno-2H-3-benzazepin-2-one.
7-methoxy-1,3,4,5-tetrahydro-1,5-etheno-2H-3-benzazepin-2-one.
8-methoxy-1,3,4,5-tetrahydro-1,5-etheno-2H-3-benzazepin-2-one.
7-hydroxy-1,3,4,5-tetrahydro-1,5-etheno-2H-3-benzazepin-2-one.
8-hydroxy-1,3,4,5-tetrahydro-1,5-etheno-2H-3-benzazepin-2-one.
8-chloro-1,3,4,5-tetrahydro-1,5-etheno-2H-3-benzazepin-2-one.

Example 3.

Preparation of 3-methyl-1,3,4,5-tetrahydro-1,5-etheno-2H-3-benzazepin-2-one.

18 g. (0.097 mole) of the 1,3,4,5-tetrahydro-1,5-etheno-2H-3-benzazepin-2-one obtained in Example 1 is dissolved in 180 ml. of anhydrous dimethylformamide. 3.89 g. (0.162 mole) of sodium hydride is added, and the mixture is agitated for a quarter of an hour at ordinary temperature. 50 g. (0.35 mole) of methyl iodide is introduced and the resulting mixture is agitated for about 20 minutes. The reaction mixture is poured over ice and extracted with benzene. The benzene extract is washed with water, dried and evaporated to dryness. The residue is dissolved in acetone and hexane is added until crystallization commences; 12 g. of 3-methyl-1,3,4,5-tetrahydro-1,5-etheno-2H-3-benzazepin-2-one is collected with a yield of 62%. M.P. 140°–141°C.

Analysis for $C_{13}H_{13}NO$ (199):
  calc. (%) C 78.4 H 6.6 N 7.0
  found (%) 78.2 6.6 7.1

Example 4.

Preparation of 3-(2-hydroxyethyl)-1,3,4,5-tetrahydro-1,5-etheno-2H-3-benzazepin-2-one.

1.16 g. (0.084 mole) of sodium hydride is added under vigorous stirring to a suspension of 4.5 g. (0.024 mole) of 1,3,4,5-tetrahydro-1,5-etheno-2H-3-benzazepin-2-one in 50 ml. of xylene. The mixture is heated under reflux for 5 minutes and is then cooled to 10°C. 1.96 g. (0.024 mole) of ethylene chlorohydrin, dissolved in 10 ml. of xylene, is added drop by drop. The mixture is then heated under reflux for 3 hours and is poured over ice. The organic phase is decanted, dried and evaporated to dryness under reduced pressure. The residue is chromatographed on a silica column. Two fractions are isolated:

1. 1.75 g. of starting material (eluent: chloroform)
2. 1.2 g. of a 1:2 mixture of
  a. 3[2-(2-hydroxyethoxy)-ethyl]-1,3,4,5-tetrahydro-1,5-etheno-2H-3-benzazepin-2-one.
  Mass spectrum m/e: 273, 255, 242; and
  b. 3-(2-hydroxyethyl)-1,3,4,5-tetrahydro-1,5-etheno-2H-3-benzazepin-2-one.
  Mass spectrum m/e: 229, 211, 198, 185 eluent: 1:1 mixture of chloroform-ethyl acetate.

The following N-substituted benzazepinones were prepared by the method of Examples 3 and 4:

3-methyl-7-chloro-1,3,4,5-tetrahydro-1,5-etheno-2H-3-benzazepin-2-one.
M.P. 145'–146°C.; yield 74%.
Analysis for $C_{13}H_{12}ClNO$ (233.7)
  calc. (%) C 66.8 H 5.2 N 5.9
  found (%) 66.4 4.9 6.1

3-methyl-7-ethyl-1,3,4,5-tetrahydro-1,5-etheno-2H-3-benzazepin-2-one.
B.P. 149°–155°C./0.001 mm.Hg.; yield 69%.
Analysis for $C_{15}H_{17}NO$ (227):
  calc. (%) H 7.5 N 6.2
  found (%) 7.4 5.5

3,7-dimethyl-1,3,4,5-tetrahydro-1,5-etheno-2H-3-benzazepin-2-one.
M.P. 81°–84°C.; yield 31%.

Analysis for $C_{14}H_{15}NO$ (213):
  calc. (%) C 78.8 H 7.0 N 6.6
  found (%) 78.3 6.9 6.9

3-isopropyl-1,3,4,5-tetrahydro-1,5-etheno-2H-3-benzazepin-2-one.

3-allyl-1,3,4,5-tetrahydro-1,5-etheno-2H-3-benzazepin-2-one.

3-benzyl-1,3,4,5-tetrahydro-1,5-etheno-2H-3-benzazepin-2-one.

3-carbethoxy-1,3,4,5-tetrahydro-1,5-etheno-2H-3-benzazepin-2-one.

3-(2-diethylaminoethyl)-1,3,4,5-tetrahydro-1,5-etheno-2H-3-benzazepin-2-one.

1,3-dimethyl-1,3,4,5-tetrahydro-1,5-etheno-2H-3-benzazepin-2-one.

3-methyl-7-methoxy-1,3,4,5-tetrahydro-1,5-etheno-2H-3-benzazepin-2-one.

3-methyl-8-methoxy-1,3,4,5-tetrahydro-1,5-etheno-2H-3-benzazepin-2-one.

3,7,8-trimethyl-1,3,4,5-tetrahydro-1,5-etheno-2H-3-benzazepin-2-one.

3-p-methoxybenzyl-1,3,4,5-tetrahydro-1,5-etheno-2H-3-benzazepin-2-one.

Example 5.

Preparation of 3-(N-methylcarbamyl)-1,3,4,5-tetrahydro-1,5-etheno-2H-3-benzazepin-2-one.

A solution of 12 g. (0.21 mole) methyl isocyanate in 20 ml. xylene is added drop by drop under vigorous stirring to a suspension of 12 g. (0.065 mole) of 1,3,4,5-tetrahydro-1,5-etheno-2H-3-benzazepin-2-one in 250 ml. xylene, heated to 100°C. When the addition of the isocyanate is completed, the mixture is heated under reflux for 2 hours and then evaporated to dryness under reduced pressure. The residue is dissolved in ethyl ether in presence of animal black and the solution is filtered and evaporated to dryness. The obtained solid is recrystallized from isopropyl ether. 13.2 g. of 3-(N-methylcarbamyl)-1,3,4,5-tetrahydro-1,5-etheno-2H-3-benzazepin-2-one in the form of a white solid is obtained with an 83% yield. M.P. 119–121°C.

Analysis for $C_{14}H_{14}N_2O_2$ (242):
  calc. (%) C 69.4 H 5.8 N 11.6
  found (%) 69.7 5.9 11.5

The following N-carbamyl-benzazepinones were also prepared by the method of Example 5:

3-(N-allylcarbamyl)-1,3,4,5-tetrahydro-1,5-etheno-2H-3-benzazepin-2-one.
  M.P. 87°–90°C.; yield 90%.

Analysis for $C_{16}H_{16}N_2O_2$ (268):
  calc. (%) C 71.6 H 5.9 N 10.5
  found (%) 70.9 5.6 10.4

3-(N-phenylcarbamyl)-1,3,4,5-tetrahydro-1,5-etheno-2H-3-benzazepin-2-one.
  M.P. 176°–177°C.; yield 94%.

Analysis for $C_{19}H_{16}N_2O_2$ (304)
  calc. (%) C 75.0 H 5.3 N 9.2
  found (%) 74.2 5.3 8.8

3-(N-ethylcarbamyl)-1,3,4,5-tetrahydro-1,5-etheno-2H-3-benzazepin-2-one.
  M.P. 83.5°–86°C.; yield 35%.

Analysis for $C_{15}H_{16}N_2O_2$ (256):
  calc. (%) C 70.3 H 6.3 N 10.9
  found (%) 71.0 6.2 10.9

3-(N-methylcarbamyl)-7-chloro-1,3,4,5-tetrahydro-1,5-etheno-2H-3-benzazepin-2-one.
  M.P. 156°–158°C.; yield 69%.

Analysis for $C_{14}H_{13}ClN_2O_2$ (276.5):
  calc. (%) C 60.8 H 4.7 N 10.1
  found (%) 61.9 4.8 10.1

3-(N-allylcarbamyl)-7-chloro-1,3,4,5-tetrahydro-1,5-etheno-2H-3-benzazepin-2-one.
  M.P. 116°–118°C.; yield 67%.

Analysis for $C_{16}H_{15}ClN_2O_2$ (302.5):
  calc. (%) C 63.4 H 4.9 N 9.3
  found: (%) 64.6 4.8 9.3

3-(N-phenylcarbamyl)-7-chloro-1,3,4,5-tetrahydro-1,5-etheno-2H-3-benzazepin-2-one.
  M.P. 147°–149°C.; yield 62%.

Analysis for $C_{19}H_{15}ClN_2O_2$ (338.5):
  calc. (%) C 67.3 H 4.4 N 8.3
  found (%) 66.8 4.5 8.5

3-(N-methylcarbamyl)-7-ethyl-1,3,4,5-tetrahydro-1,5-etheno-2H-3-benzazepinon-2-one.
  Yield 79%.

Analysis for $C_{16}H_{18}N_2O_2$ (270):
  calc. (%) C 71.1 H 6.7 N 10.4
  found (%) 70.5 6.7 9.7

3-(N-methylcarbamyl)-7,8-dimethyl-1,3,4,5-tetrahydro-1,5-etheno-2H-3-benzazepin-2-one.

Due to their activity on the central nervous system, the benzazepinones of the invention are useful as drugs. They are in particular useful as anxiolytics and as stimulants of mental activity as shown by the following pharmacological tests.

For these tests, the following compounds have been used:

Compound

A. 1,3,4,5-tetrahydro-1,5-etheno-2H-3-benzazepin-2-one

B. 3-methyl-1,3,4,5-tetrahydro-1,5-etheno-2H-3-benzazepin-2-one

C. 3-(N-methylcarbamyl)-1,3,4,5-tetrahydro-1,5-etheno-2H-3-benzazepin-2-one

D. 3-methyl-7-ethyl-1,3,4,5-tetrahydro-1,5-etheno-2H-3-benzazepin-2-one

E. 3-methyl-7-chloro-1,3,4,5-tetrahydro-1,5-etheno-2H-3-benzazepin-2-one

F. 3,7-dimethyl-1,3,4,5-tetrahydro-1,5-etheno-2H-3-benzazepin-2-one

G. 3-(N-methylcarbamyl)-7-chloro-1,3,4,5-tetrahydro-1,5-etheno-2H-3-benzazepin-2-one H. 3-(N-phenylcarbamyl)-1,3,4,5-tetrahydro-1,5-etheno-2H-3-benzazepin-2-one I. 3-(N-allylcarbamyl)-7-chloro-1,3,4,5-tetrahydro-1,5-etheno-2H-3-benzazepin-2-one J. 3-(N-phenylcarbamyl)-7-chloro-1,3,4,5-tetrahydro-1,5-etheno-2H-3-benzazepin-2-one Initial performance test in rats.

(unpublished original method of the Applicants).

When preparing the rats for a conditioned reflex, the animal is taught an avoidance reaction by running away in response to an electric shock lasting 3 seconds, repeated several times per minute over a period of a few minutes. The innate running away reaction takes place before the end of the shock 15 to 20 times out of 20 tests.

A few hours later, the training is repeated and a reduction in the avoidance performances is observed. This is interpreted as an expression of a conflicting situation which diminishes the performance during the second time round. Anxiolytic substances oppose this effect.

A peritoneally administered dose of 1.2 mg./kg. body weight of product A already improves the performance.

For the other compounds, the minimum dose expressed in mg./kg., which improves the performance is:

Compound

B. 11
C. 3.1
D. 7.1
E. 2.3
F. 2.1
G. 2.8

Spinal fixation.

(T. J. CHAMBERLAIN et al. J. Neuro-Physiol.26,(4), (1963),662–673).

Wister rats were anesthetized with nembutal and a part of the anterior lobe of the cerebellum was removed. Upon awakening, the animals had a postural asymmetry of the hind paws (hypertonic ipsilateral flexion and hypotonic contralateral extension).

If the spinal medulla is sectioned within the 35 minutes which follow the appearance of the asymmetry, then all the animals lose this asymmetry, i.e., there is not a sufficient lapse of time for fixation.

On the other hand, if there is a delay of 45 minutes or more, then 95% of the animals show a persistence of the asymmetry. The control animals, therefore, never show a persistence of the asymmetry with a delay of 35 minutes.

The compounds which induce a persistence of this same delay diminish, therefore, the spinal fixation time.

The intraperitoneal administration of the compounds according to the present invention before the cerebellar lesion brings about a diminution of the time necessary for the fixation, since the treated animals show a persistence of the asymmetry in contradistinction to the control animals.

For the following compounds of the invention, the minimum active dose, expressed in mg./kg., is:

Compound

A. 18.5
B. 19.9
C. 24.2
H. 30.4
I. 30.2
J. 33.8

The benzazepinones of the invention have a low toxicity. In intraperitoneal administration in rat, the LD 50, in mg./kg. animal body weight, is as follows:

Compound

A. 550
B. >1000
C. >1000
H. >1000

The compositions according to the present invention which can be used for oral administration, may be solid or liquid and may be, for example, in the form of tablets, pills, dragees, gelatine capsules, solutions, syrups or the like. Likewise, the compositions for use by parenteral administration are the known pharmaceutical forms for this type of administration, for example solutions, suspensions or aqueous or oily emulsions. For administration by the rectal route, the compositions of the present invention generally take the form of suppositories.

The pharmaceutical forms, such as solutions for injection, suspensions for injection, tablets, drops, suppositories are prepared by the methods currently used by pharmacists. The compounds to be used according to the present invention are mixed with a solid or liquid vehicle, which is non-toxic and pharmaceutically acceptable, and optionally with a dispersing agent, a disintegrating agent, a lubricant, a stabilizer or the like. It is to be understood that solutions, emulsions, dispersions or the like intended for injection, must be sterile. If necessary and/or desired, preservatives, sweeteners, coloring materials and the like may be added.

Likewise, the solid or liquid pharmaceutical vehicles used in these compositions are well known in the art. Solid pharmaceutical excipients for the preparation of tablets or capsules include, for example, starch, talc, calcium carbonate, lactose, sucrose, magnesium stearate and the like.

The percentage of active product in the pharmaceutical compositions may vary within very wide limits according to the conditions of use, particularly according to the frequency of administration.

A convenient dosage is from 20 mg. to 1 g. per day, for example a dosage of 3 times 50 mg. per day.

I claim:

1. A member selected from the group consisting of
   a. a 1,3,4,5-tetrahydro-1,5-etheno-2H-3-benzazepin-2-one derivative having the formula

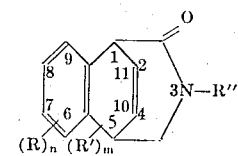

in which R and R' represent each a member selected from the group consisting of hydrogen, halogen, hydroxyl, alkyl having 1 to 4 carbon atoms and alkoxy having 1 to 4 carbon atoms,
   R'' represents a member selected from the group consisting of hydrogen, alkyl, hydroxyalkyl, dialkylaminoalkyl and carbalkoxy, each alkyl having 1 to 5 carbon atoms, alkenyl having 2 to 4 carbon atoms, methoxybenzyl and carbamyl having the formula —CONHR''', in which R''' is hydrogen, alkyl having 1 to 4 carbon atoms, alkenyl having 2 to 4 carbon atoms, or phenyl, and
   n and m are each a whole number 1 or 2, and
   b. an addition salt thereof with a pharmaceutically acceptable acid.

2. A compound as claimed in claim 1, said compound being 1,3,4,5-tetrahydro-1,5-etheno-2H-3-benzazepin-2-one.

3. A compound as claimed in claim 1, said compound being 3-methyl-1,3,4,5-tetrahydro-1,5-etheno-2H-3-benzazepin-2-one.

4. A compound as claimed in claim 1, said compound being 3-(N-methylcarbamyl)-1,3,4,5-tetrahydro-1,5-etheno-2H-3-benzazepin-2-one.

5. A compound as claimed in claim 1, said compound being 3-methyl-7-ethyl-1,3,4,5-tetrahydro-1,5-etheno-2H-3-benzazepin-2-one.

6. A compound as claimed in claim 1, said compound being 3-methyl-7-chloro-1,3,4,5-tetrahydro-1,5-etheno-2H-3-benzazepin-2-one.

7. A compound as claimed in claim 1, said compound being 3,7-di-methyl-1,3,4,5-tetrahydro-1,5-etheno-2H-3-benzazepin-2-one.

8. A compound as claimed in claim 1, said compound being 3-(N-methylcarbamyl)-7-chloro-1,3,4,5-tetrahydro-1,5-etheno-2H-3-benzazepin-2-one.

9. A compound as claimed in claim 1, said compound being 3-(N-phenylcarbamyl)-1,3,4,5-tetrahydro-1,5-etheno-2H-3-benzazepin-2-one.

10. A compound as claimed in claim 1, said compound being 3-(N-allylcarbamyl)-7-chloro-1,3,4,5-tetrahydro-1,4-etheno-2H-3-benzazepin-2-one.

11. A compound as claimed in claim 1, said compound being 3-(N-phenylcarbamyl)-7-chloro-1,3,4,5-tetrahydro-1,5-etheno-2H-3-benzazepin-2-one.

12. 3-[2-(2-hydroxyethoxy)-ethyl]-1,3,4,5-tetrahydro-1,5-etheno-2H-3-benzazepin-2-one.

* * * * *

UNITED STATES PATENT OFFICE
CERTIFICATE OF CORRECTION

Patent No. 3,860,580　　　　　　　　　　Dated January 14, 1975

Inventor(s) Rene Denayer

It is certified that error appears in the above-identified patent and that said Letters Patent are hereby corrected as shown below:

Column 1, change "[73] Assignee: U B C, Societe Anonyme, Saint-" to -- [73] Assignee: U C B, Societe Anonyme, Saint- --.

Signed and sealed this 27th day of May 1975.

(SEAL)
Attest:

RUTH C. MASON
Attesting Officer

C. MARSHALL DANN
Commissioner of Patents
and Trademarks